(No Model.)
J. MACPHAIL.
HARROW.
No. 330,795. Patented Nov. 17, 1885.
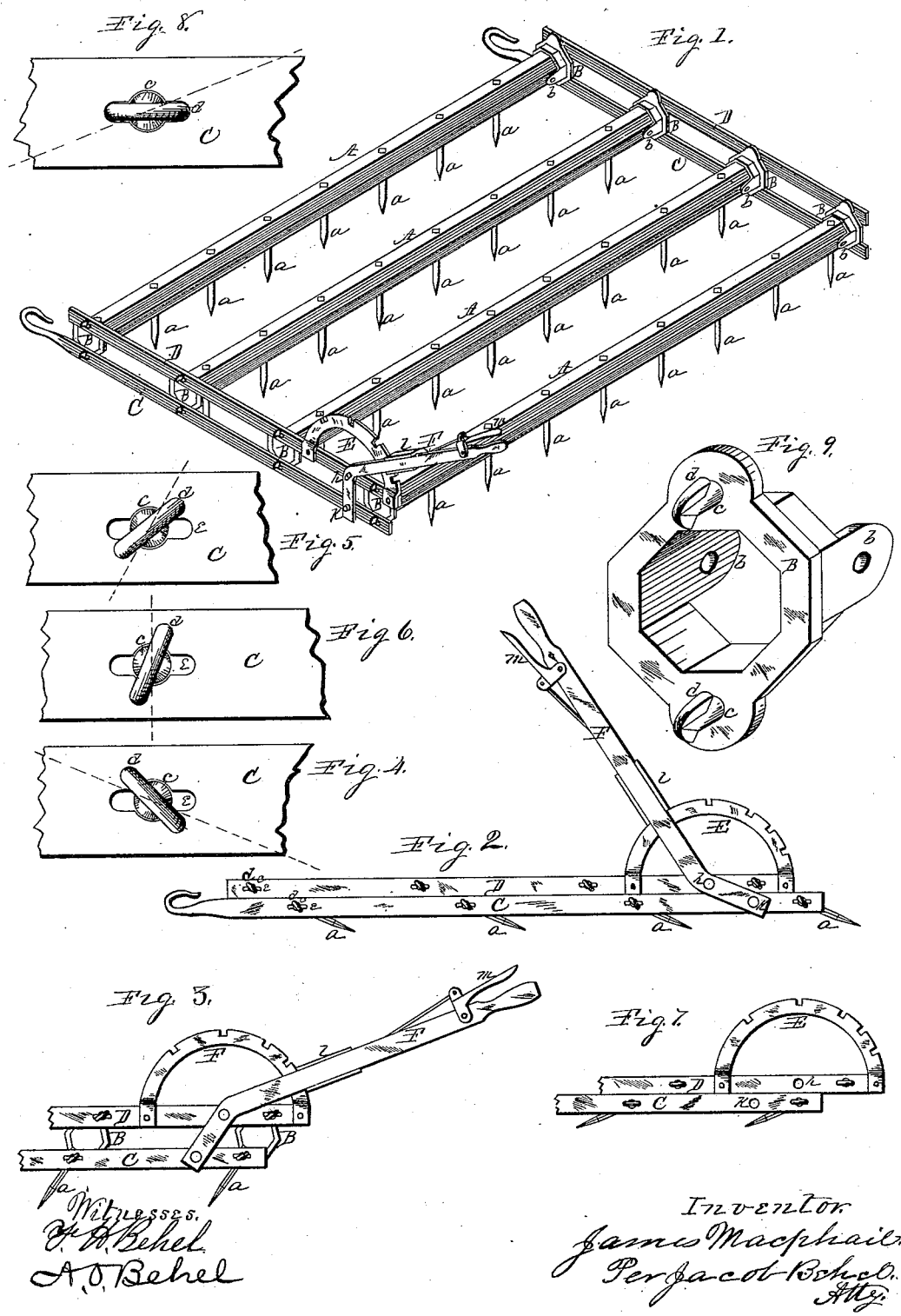

UNITED STATES PATENT OFFICE.

JAMES MACPHAIL, OF ROCKFORD, ILLINOIS, ASSIGNOR TO THE N. C. THOMPSON MANUFACTURING COMPANY, OF SAME PLACE.

HARROW.

SPECIFICATION forming part of Letters Patent No. 330,795, dated November 17, 1885.

Application filed February 25, 1885. Serial No. 156,990. (No model.)

*To all whom it may concern:*

Be it known that I, JAMES MACPHAIL, a citizen of the United States, residing in the city of Rockford, in the county of Winnebago and State of Illinois, have invented a new and useful Harrow, of which the following is a specification.

This invention relates to a class of harrows known as the "adjustable harrow," in which the teeth may be adjusted to various angles relatively with the line of draft; and its object is to produce an efficient harrow of its class, simple in construction, capable of a ready adjustment to vary the inclination of the teeth relatively with the line of draft, and of a construction to permit a ready separation of the parts for the purposes of storage and shipment, all of which will be hereinafter more fully described.

In the accompanying drawings, Figure 1 is an isometrical represention of a harrow embodying my invention. Figs. 2 and 3 are end elevations showing the opposite extreme adjustments. Figs. 4 and 5 are enlarged views of a portion of the end bars, showing the opposite extreme adjustments, in which the dotted lines show the inclination of the teeth. Fig. 6 is also an enlarged view, in which the dotted line shows the teeth in their vertical adjustment. Fig. 7 is an end elevation showing the end bars in position to connect and disconnect the parts. Fig. 8 is an enlarged view showing the position to permit the parts to be connected or disconnected, and the dotted line thereon represents the position of the teeth; and Fig. 9 is an isometrical representation of the end socket of the tooth-beams.

In this instance the tooth-beams A of my improved harrow are of wood, preferably of octagon form in section, and in these beams the teeth are placed in the usual manner. The ends of the tooth-beams are fitted with a socket, B, which are fixed in place on the beams by means of a bolt passed through the ears *b* of the socket and through the beam. The sockets are provided with stud-journals *c*, projecting from the end thereof on opposite sides, and the outer ends of the journals are provided on opposite sides with lateral projections *d*, producing a button-formed head.

At C are represented the lower end bars, and at D the upper end bars, both of which are provided at proper intervals with openings *e*, of proper form to admit the passage of the button-formed head *d*, and receive the stud-journals *c*, to permit an oscillatory movement of the journals therein. The end bars C, placed on each other, or in the relative position represented in Fig. 7, will permit the passage of the button-head journals of the socket on the ends of the tooth-beams, and operate to connect the tooth-beams and end bars when the bars are separated or changed to any other position than that represented in Fig. 7, sufficient to turn the button-heads of the stud-journals from the slotted openings in the bars.

At E is represented a toothed segment-ratchet fixed to one of the upper end bars, preferably at or near its rear end, and in this instance is bent immediately above its connection with the bar to bring its outer surface in the plane of the outer face of the bar.

At F is represented a hand-lever of the bent form shown, and is pivotally connected near its angle-point to the upper end bar at a point, *h*, concentric with the toothed segment-ratchet, and its lower end is pivotally connected to the lower end bar at the point *k* in such a manner that the forward movement of the free handle end of the lever will cause a forward over-rolling movement of the toothed beams to incline the teeth rearward, and a rearward movement of the free handle end of the lever will cause a limited rearward over-rolling movement of the tooth-beams to give the teeth a limited forward inclination. The forward inclination of the teeth is limited by means of the hand-lever engaging the rear bent end portion of the segment-ratchet. The hand-lever is provided with a spring-actuated bolt-detent supported in a case, *l*, in position to engage the teeth of the segment-ratchet to hold the lever in its adjusted position. The bolt detent has a rod-connection with a thumb-lever, *m*, pivoted to the handle end portion of the lever to enable the operator to disengage the detent-bolt to permit the adjustment of the teeth to vary or regulate their inclination. The lower end bars, C, have their forward ends produced in hook form for the purpose of connecting with a draw-bar in the usual manner.

From the foregoing it will be seen that my improved harrow is capable of a ready adjustment to vary the inclination of the teeth either forward or rearward to any practical extent, and that if the hand-lever is disconnected from the end bars the tooth-beams can be disconnected from the end bars, separating the parts of the harrow for the purposes of storage or shipment.

I claim as my invention—

1. The herein-described coupling-socket, having a central opening to receive a beam, and stud-journals formed with securing-heads, substantially as set forth.

2. The combination, with the tooth-beams and with parallel end bars formed with openings, as described, of coupling-sockets fitted to the ends of said beams, and formed with stud-journals adapted to project through the opening of the end bars, and having inclined heads, substantially as set forth.

3. The combination, with the tooth-beams and end bars, of coupling-sockets provided with headed stud-journals, and serving to support the beams and secure the beams and bars together, and a segment-ratchet, a hand-lever, and detent, substantially as set forth.

JAMES MACPHAIL.

Witnesses:
  A. O. BEHEL,
  C. E. SOVEREIGN.